United States Patent Office 3,046,279
Patented July 24, 1962

3,046,279
17-YOHIMBOL DERIVATIVES
John Shavel, Jr., Mendham, and George Bobowski, East Orange, N.J., assignors to Warner-Lambert Pharmaceutical Company, Morris Plains, N.J., a corporation of Delaware
No Drawing. Filed June 15, 1960, Ser. No. 36,164
19 Claims. (Cl. 260—287)

The present invention relates to new and novel yohimbane derivatives of the formula:

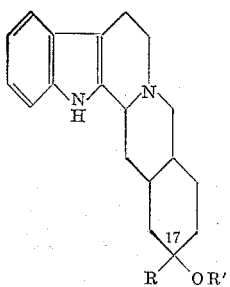

wherein R is an alkyl group of the formula $C_nH_{2n+1}$ where $n$ is 1 to 18, an alkenyl group of the formula $C_mH_{2m-1}$ or an alkynyl group of the formula $C_mH_{2m-3}$ where $m$ is 2 to 18, a cycloalkyl group having 5 to 7 carbon atoms or aryl and aralkyl groups either unsubstituted or substituted with one or more lower alkyl, lower alkoxy, halogen, phenyl or di-lower alkylamino groups and wherein R' is hydrogen or an acyl radical of an aliphatic or aromatic carboxylic or sulfonic acid. The pharmaceutically acceptacle non-toxic acid addition and quaternary ammonium salts of these compounds are also included within the scope of this invention. The invention further relates to a method of producing these compounds.

As used throughout the specification and in the claims, the terms "lower alkyl" and "lower alkoxy" refer to straight and branched chain aliphatic groups having 1 to 6 carbon atoms.

The new and novel 17-R-yohimbols and esters thereof of this invention have interesting pharmacological activity, being useful as tranquilizers, analgesics, muscle relaxants and hypotensive agents, and also are valuable intermediates in the production of other pharmacologically active compounds bearing the yohimbane nucleus.

Among the compounds included within the scope of and encompassed by this invention are 17-phenylyohimbol, 17-(α-naphthyl)yohimbol, 17-(β-naphthyl)yohimbol, 17-methylyohimbol, 17-ethylyohimbol, 17-amylyohimbol, 17-dodecylyohimbol, 17-stearylyohimbol, 17-vinylyohimbol, 17-allylyohimbol, 17-ethynylyohimbol, 17-decylethynylyohimbol, 17-cyclopentylyohimbol, 17-cyclohexylyohimbol, 17-cycloheptylyohimbol, 17-benzylyohimbol, 17-phenylethylyohimbol, 17-biphenylylyohimbol, 17-(p-methoxyphenyl)yohimbol, 17-(p-fluorophenyl)yohimbol, 17-(p-chlorophenyl)yohimbol, 17-(o-tolyl)yohimbol, 17-(p-tolyl)yohimbol, 17-(p-methoxyphenyl)yohimbol, 17-(p-butoxyphenyl)yohimbol, 17 - (p-diethylaminophenyl) yohimbol, 17-(p-dimethylaminophenyl)yohimbol, 17-(p-chlorobenzyl)yohimbol, and the like. Also included within the scope of this invention are esters of 17-R-yohimbols with such carboxylic and sulfonic acids as acetic acid, propionic acid, butyric acid, benzoic acid, p-chlorobenzoic acid, p-methoxybenzoic acid, 3,4,5-trimethoxybenzoic acid, methane sulfonic acid, ethane sulfonic acid, benzene sulfonic acid, p-toluene sulfonic acid and the like.

The 17-R-yohimbols of this invention may be prepared from yohimbone by the following reaction:

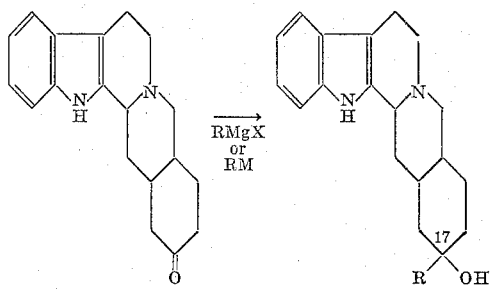

where R is as described above, X is bromine, chlorine or iodine and M is lithium, potassium or sodium.

The starting material yohimbone is a known compound and its preparation is described by B. Witkop in Ann. 554, p. 83 (1943).

The starting material yohimbone, in a suitable solvent such as benzene, tetrahydrofuran and the like, may be reacted with a Grignard reagent RMgX in anhydrous ether. Alternately, an organolithium reagent of the formula RLi in a solvent such as ether, tetrahydrofuran, benzene and the like may be used. Where R is $C_mH_{2m-3}$, $m$ being as described above, an organo sodium or potassium reagent of the formula RNa or RK in liquid ammonia is generally preferred. The reaction is preferably carried out by adding a solution of yohimbone to an excess of the reagent, with the temperature being maintained within the range of 0° C. to about —70° C.

The 17-R-yohimbols prepared as described above may be used in the form of the alcohols or the latter may be converted into esters by reaction with an esterifying agent as follows:

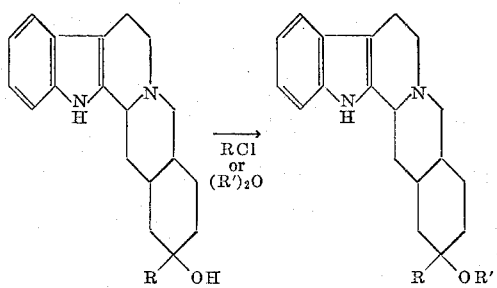

where R' is alkyl sulfonyl, alkyl substituted aryl sulfonyl, the acyl radical of an alkyl carboxylic acid or the acyl radical of an aryl carboxylic acid. Esterification may be carried out by conventional techniques, with the 17-R-yohimbol being reacted with an acid anhydride or an acyl halide.

The new and novel compounds of this invention have an asymmetric carbon atom at the 17-position and thus exist as epimers. If desired, the mixed epimers may be separated by fractional recrystallization from solvents, such as acetonitrile, acetone, methanol, ethanol, ethyl acetate, chloroform and the like or by chromatography over activated alumina using solvents such as those listed above or benzene.

The 17-R-yohimbols and esters thereof may be converted into their pharmaceutically acceptable non-toxic acid addition or quaternary ammonium salts. Exemplary of non-toxic acid addition salts are those formed with maleic, fumaric, benzoic, ascorbic, succinic, bismethylenesalicylic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric and nitric acids. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like. Each dosage form will normally contain about 5 to about 50 milligrams of active ingredient.

The 17-R-yohimbols of this invention are also valuable intermediates in the preparation of other pharmacologically active compounds. For example, they may be reacted with phosphorus oxychloride or thionyl chloride as described in our copending application, entitled "17-substituted Yohimbenes and Process Therefor," filed concurrently herewith, to form compounds of the formula:

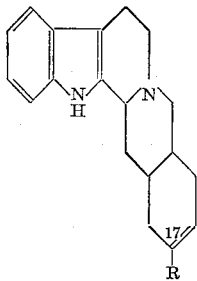

where R is as described above. A single compound is thereby obtained regardless of whether the reactant is a mixture of epimers or is but one of the possible epimers.

The following examples are included in order further to illustrate the present invention:

EXAMPLE 1

*17-Methylyohimbol*

A solution of 20 g. of yohimbone in 1 liter of dry tetrahydrofuran (distilled from LiAlH$_4$) is added dropwise to 150 ml. of 1.5 N methyl magnesium chloride in ether with stirring over a period of 70 minutes at —70°. After one hour a solution of saturated aqueous ammonium chloride (15 ml.) is added and the mixture stirred and filtered. The solid is again treated with 200 ml. saturated ammonium chloride solution, stirred for two hours and exhaustively extracted with chloroform. The extract is dried over sodium sulfate and evaporated to dryness. Trituration with acetonitrile yields 4.8 g. of material, M.P. 247–249° C. $[\alpha]_D^{25}=-70°$, C.=.500, l.=1 dm., chloroform. This material is recrystallized three times from chloroform to yield 17-methylyohimbol, M.P. 252–256° C., $[\alpha]_D^{25}=-70°$, C.=.800, l.=1° dm., chloroform; $[\alpha]_D^{25}=-71.5°$, C.=.500, l.=1 dm., pyridine.

*Analysis.*—Calc. C$_{20}$H$_{26}$N$_2$O: C, 77.38; H, 8.44; N, 9.03. Found: C, 77.06; H, 8.76; N, 8.70.

EXAMPLE 2

*17-Ethynylyohimbol*

A solution of 50 g. of yohimbone in 1.8 liter dry tetrahydrofuran (distilled from LiAlH$_4$) is added with vigorous stirring to a solution of 1.0 mol of sodium acetylide in liquid ammonia (prepared by bubbling acetylene through sodium amide in liquid ammonia) over a period of two hours at —35 to —45° C. A slow stream of acetylene is passed through the stirred mixture during the addition. A finely ground solid ammonium chloride (45 g.) is added portionwise at —50° C. and the contents of the reaction flask poured into a dish. The ammonia is allowed to evaporate at room temperature, followed by the evaporation of the solvent in vacuo. The brown residue is stirred with 450 ml. of saturated aqueous ammonium chloride solution and 600 ml. of chloroform, and the mixture is filtered. The two liquid phases in the filtrate are separated. The chloroform layer is dried over sodium sulfate, and the solvent removed in vacuo, leaving a green-black colored solid residue. Trituration with 80 ml. of acetonitrile yields 30 g. of tan crystals. Further trituration with 50 ml. of methanol gives 25.7 g. of material, $[\alpha]_D^{25}=-14°$, C.=.570, l.=1 dm., chloroform. The combined mother liquors, after evaporation to dryness under nitrogen and trituration of the resulting solid with 25 ml. of methanol, yield an additional 7.6 g. of material, $[\alpha]_D^{25}=-13°$, C.=.525, l.=1 dm., chloroform, M.P. 225–228° C. Recrystallization from ethyl acetate yields purified 17-ethynylyohimbol, M.P. 228–230° C., $[\alpha]_D^{25}=-15°$, C.=.585, l.=1 dm., chloroform. The total yield is 33.3 g., 61% of theory.

*Analysis.*—Calc. C$_{21}$H$_{24}$N$_2$O: C, 78.71; H, 7.55; N, 8.74. Found: C, 78.39; H, 7.65; N, 8.73.

EXAMPLE 3

*17-Ethynylyohimbol*

0.1 mol potassium acetylide is prepared as described in Tetrahedron, vol. 2, No. 1/2, page 98 (January 1958), by bubbling acetylene through a solution of potassium t-amylate. To the resulting solution is added 8.0 g. yohimbone in 400 ml. tetrahydrofuran over 90 minutes, with continuous bubbling of acetylene at 0° C. Finely divided ammonium chloride is added and the mixture is filtered. The filtrate is evaporated to dryness in vacuo and the residue is taken up with chloroform. The extract is again evaporated to dryness, the residue dissolved in acetonitrile, treated with charcoal and evaporated to about 10 ml. 1.0 g. of solid separates which is dissolved in acetone and treated with charcoal to form a light greenish solution. This solution is evaporated to dryness and the residue triturated with acetonitrile to yield 0.35 g. 17-ethynylyohimbol, M.P. 228–230° C., $[\alpha]_D^{25}=-15°$ C.=.585 in chloroform.

*Analysis.*—Calc. C$_{21}$H$_{24}$N$_2$O: C, 78.71; H, 7.55; N, 8.74. Found: C, 78.39; H, 7.65; N, 8.73.

EXAMPLE 4

*17-Cyclohexylyohimbol*

A solution of 35 g. of yohimbone in 2 liter of dry tetrahydrofuran (distilled from LiAlH$_4$) is added with stirring to 800 ml. of 0.9 N cyclohexyl magnesium bromide in ether at 0° C. over a period of two hours. After one hour a solution of 80 g. of ammonium chloride in 700 ml. of water is added and the mixture is stirred for two hours. The two liquid phases are separated and the aqueous layer is extracted with two portions of 150 ml. of chloroform. The combined extracts are dried over sodium sulfate and the solvent removed in vacuo. The resulting black-brown semi-solid residue is dissolved in 800 ml. of 4 N acetic acid and the solution is extracted with 200 ml. of petroleum ether (B.P. 60–70° C.) and 150 ml. of diethyl ether to remove residual cyclohexyl bromide and bicyclohexyl. The acetic acid solution is precipitated by ammonia, extracted with 400 ml. of chloroform, and treated with charcoal. The extract is evaporated to dryness in vacuo and the residue dissolved in 200 ml. of acetone. Ethanolic hydrogen chloride is added dropwise to a pH of 4.0 and the mixture is cooled and filtered. 29.5 g. of the crude hydrochloride are recovered. This hydrochloride is made alkaline by ammonia, extracted with 300 ml. of methylene chloride, and the extract is dried over sodium sulfate. Concentration of this extract to 150 ml. followed by cooling, yields 4.5 g. of white crystals, M.P. 248-255° C., [α]$_D^{25}$=—58°, C.=.755, l.=1 dm., chloroform. Evaporation of the mother liquor to dryness and trituration with 80 ml. of ethyl acetate with cooling yields an additional 3.1 g. of material, M.P. 250-256° C., [α]$_D^{25}$=—62°, C.=.985, l.=1 dm., chloroform. Recrystallization of these combined crops twice from acetone and then from methanol yields purified 17-cyclohexylyohimbol, M.P. 257-261° C., [α]$_D^{25}$=—61°, C.=1.7, l.=1 dm., chloroform; [α]$_D^{25}$=—33°, C.=1.20, l.=1 dm. pyridine. Chromatography of the mother liquor over alumina (not acid washed) and recrystallization of the combined fractions from ethyl acetate yields 3.4 g. of additional material, [α]$_D^{25}$=—58° C., chloroform.

*Analysis.*—Calc. $C_{25}H_{34}N_2O$: C, 79.32; H, 9.05; N, 7.40. Found: C, 79.20; H, 9.01; N, 7.46.

EXAMPLE 5

17-Phenylyohimbol

A solution of 10 g. of yohimbone in 800 ml. of dry tetrahydrofuran (distilled, from LiAlH$_4$) is added at —30° C. to 0.13 mol of phenyl magnesium bromide in ether over one hour with vigorous stirring. A fine stream of nitrogen is passed through the system during the addition. The subsequent ionophoresis (700 v./2 ma./5 N acetic acid/one hour) of the reaction mixture showed complete reaction. (Relative mobility in respect to yohimbone 0.85). A solution of 15 g. of ammonium chloride in 100 ml. of water is added at —30 to 0° C. and stirred for forty minutes. The two layers are separated and the aqueous phase extracted twice with 100 ml. of ethyl acetate. The combined organic extracts are dried over sodium sulfate and the solvent removed in vacuo. The resulting semi-solid residue is refluxed with 150 ml. of petroleum ether (B.P. 30-75° C.) to remove residual bromo benzene and biphenyl. After cooling the mixture is filtered and the filtrate, containing only traces of phenylyohimbols, is discarded. The residue weighs 13.0 g. and is crude 17-phenylyohimbol: [α]$_D^{25}$=±0.0°, C.=.400, l.=1 dm., chloroform.

The crude product, constituting a mixture of the two epimers (about 50/50) is slurried on a magnetic stirrer with 90 ml. of chloroform at 35° C. for four hours. After cooling, the homogeneous mush is filtered, giving 3.5 g. of material, M.P. 245-255° C., [α]$_D^{25}$=+64° C.=.45, l.=1 dm., chloroform. Concentration of the mother liquor to about 50 ml. and cooling yields 4.1 g. of white crystals, M.P. 270-272° C., [α]$_D^{25}$=—53°, C.=.75, l.=1 dm., chloroform. After evaporation of the mother liquor to dryness and trituration with 15 ml. of methanol-acetonitrile (1:1), a third crop of material weighing 0.9 g. is obtained, [α]$_D^{25}$=+57°, C.=.500, l.=1 dm., chloroform. Further concentration of the mother liquor to about 8 ml. and cooling gives an additional 0.2 g. of tan colored crystals, [α]$_D^{25}$=—27°, C.=.45, l.=1 dm., chloroform. The total yield constitutes 72.5 percent of theory of 17-phenylyohimbol.

EXAMPLE 6

The positively-rotating fractions from Example 5, [α]$_D^{25}$=+64° and +57°, chloroform (3.5 g. and 0.9 g., respectively), are slurried with 45 ml. of methanol on a magnetic stirrer for five hours at 35° C. After cooling and filtration, 2.8 g. of white-tan colored crystals are obtained, M.P. 255-262° C., [α]$_D^{25}$=+74°, C.=.55, l.=1 dm., chloroform. Recrystallization of this material from chloroform and then from 95 percent ethanol yields crystals of the pure positively-rotating epimer of 17-phenylyohimbol, M.P. 255-262° C., [α]$_D^{25}$=+75°, C.=0.600, l.=1 dm., chloroform; [α]$_D^{25}$=+62°, C.=0.615, l.=1 dm., pyridine.

*Analysis.*—Calc. $C_{25}H_{28}N_2O \cdot \frac{1}{2}H_2O$: C, 78.70; H, 7.66; N, 7.34. Found: C, 78.86; H, 7.80; N, 7.35.

EXAMPLE 7

The negatively-rotating fractions from Example 5, [α]$_D^{25}$=—53° and —29°, chloroform (4.1 g. and 0.2 g., respectively), are dissolved in 160 ml. of hot chloroform and concentrated to about 70 ml. After cooling 1.6 g. of white crystals are obtained. Two more recrystallizations from chloroform yields 0.4 g. of the pure negatively-rotating epimer of 17-phenylyohimbol, M.P. 275-279° C., [α]$_D^{25}$=—65.5°, C.=1.00, l.=1 dm., chloroform.

*Analysis.*—Calc. $C_{25}H_{28}N_2O$: C, 80.61; H, 7.58; N, 7.52. Found: C, 80.90; H, 7.62; N, 7.25.

The following Examples 8 to 11 illustrate the preparation of acid addition salts of the positively-rotating epimer of 17-phenylyohimbol.

EXAMPLE 8

To a solution of 0.5 g. of the positively-rotating epimer of 17-phenylyohimbol obtained in Example 6 in 30 ml. absolute ethanol is added 2 ml. of saturated ethanolic hydrogen chloride dropwise. The mixture is cooled, the crystals are recovered by filtration and are recrystallized from 95% ethanol to yield the hydrochloride salt, M.P. 282-288° C., [α]$_D^{25}$=—60°, C.=1.075, l.=1 dm., 95% aq. pyridine.

*Analysis.*—Calc. $C_{25}H_{29}N_2OCl \cdot \frac{1}{2}C_2H_5OH$: C, 72.28; H, 7.46; N, 6.48; Cl, 8.21. Found: C, 72.25; H, 7.39; N, 6.77; Cl, 8.30.

EXAMPLE 9

To a solution of 0.4 g. of citric acid monohydrate in absolute ethanol is added a solution in 30 ml. absolute ethanol of 0.5 g. of the positively-rotating epimer of 17-phenylyohimbol obtained in Example 6. The mixture is concentrated to 20 ml. and 25 ml. ethyl acetate are added dropwise. Cooling and filtration yields white crystals. Recrystallization from 95% ethanol and then from absolute ethanol yields the hemicitrate salt containing 2 mols of water, M.P. 192-196° C., [α]$_D^{25}$=+43°, C.=6.1, l.=1 dm., pyridine.

*Analysis.*—Calc. $C_{25}H_{28}N_2O \cdot \frac{1}{2}C_6H_8O_7 \cdot 2H_2O$: C, 66.64; H, 7.19; N, 5.55. Found: C, 66.87; H, 6.91; N, 5.22.

EXAMPLE 10

A solution of 0.3 ml. of 85% phosphoric acid in 5 ml. ethanol is added to a solution in absolute ethanol of 0.4 g. of the positively-rotating epimer of 17-phenylyohimbol obtained in Example 6. The mixture is cooled and the crystals weighing 0.45 g. are separated by filtration. Recrystallization from a 1:1 mixture of 95% ethanol and acetone yields the monophosphate salt, M.P. 268-274° C., [α]$_D^{25}$=+58°, C.=0.84, l.=1 dm., pyridine.

EXAMPLE 11

To a solution in 30 ml. absolute ethanol of 0.3 g. of the positively-rotating epimer of 17-phenylyohimbol obtained in Example 6 is added ethanolic sulfuric acid to a pH of 3.5. The solution is concentrated to 15 ml. and 90 ml. ethyl acetate are added. The crystals are separated by filtration and recrystallized from acetonitrile to yield white crystals of the hemisulfate salt, M.P. 232-243° C., [α]$_D^{25}$=+31°, C.=1.11, l.=1 dm., 98% aqueous pyridine.

The following Examples 12 to 15 illustrate the preparation of salts of the negatively-rotating epimer of 17-phenylyohimbol.

EXAMPLE 12

To a solution in 25 ml. absolute ethanol of 0.6 g. of the negatively-rotating epimer of 17-phenylyohimbol obtained in Example 7 is added ethanolic hydrogen chloride dropwise to a pH of 3.0. The mixture is allowed to cool and the crystals separated by filtration. Recrystallization from 95% ethanol yields the hydrochloride salt, M.P. 313-314° C., [α]$_D^{25}$=+9°, C.=0.545, l.=1 dm., pyridine.

*Analysis.*—Calc. $C_{25}H_{29}N_2OCl \cdot H_2O$: C, 70.31; H, 7.32;

N, 6.56; Cl, 8.30. Found: C, 70.25; H, 7.40; N, 6.44; Cl, 7.77.

EXAMPLE 13

To a solution of 0.2 g. citric acid monohydrate in 5 ml. of absolute ethanol is added a solution in 10 ml. absolute ethanol of 0.2 g. of the negatively-rotating epimer of 17-phenylyohimbol obtained in Example 7. 15 ml. of ethyl acetate are added and the crystals separated by filtration. Recrystallization from 95% ethanol yields crystals of the hemicitrate salt, M.P. 232–238° C., $[\alpha]_D^{25}=-32°$, C.= 0.500, l.=1 dm., pyridine.

*Analysis.*—Calc. $C_{25}H_{28}N_2O \cdot \frac{1}{2}C_6H_8O_7$: C, 71.77; H, 6.89; N, 5.98. Found: C, 71.94; H, 7.15; N, 6.13.

EXAMPLE 14

To a solution of 0.4 ml. 85% phosphoric acid in 4 ml. absolute ethanol is added a solution in 25 ml. absolute ethanol of 0.4 g. of the negatively-rotating epimer of 17-phenylyohimbol obtained in Example 7. The mixture is cooled and filtered to recover 0.41 g. crystals which are recrystallized from a 1:1 mixture of acetone and 95% ethanol to yield white crystals of the monophosphate salt, M.P. 223–226° C., $[\alpha]_D^{25}=-12°$, C.=0.76, l.=1 dm., pyridine.

*Analysis.*—Calc. $C_{25}H_{28}N_2O \cdot H_3PO_4 \cdot H_2O$: C, 61.46; H, 6.81; N, 5.73; P, 6.34. Found: C, 61.59; H, 6.93; N, 5.70; P, 6.40.

EXAMPLE 15

A mixture in 50 ml. chloroform of 1 ml. methyl iodide and 0.4 g. of the negatively-rotating epimer of 17-phenylyohimbol obtained in Example 7 is refluxed for 20 minutes. The solution is concentrated 50% in volume, cooled and filtered to yield 0.45 g. crystals. Recrystallization from 60 ml. hot ethanol followed by cooling yields 0.25 g. white crystals of the methiodide quaternary ammonium salt, M.P. 251–253° C., $[\alpha]_D^{25}=+37°$, C.=0.770, l.=1 dm., 90% aqueous pyridine.

The following Example 16 is illustrative of the preparation of esters of the 17-R-yohimbols of this invention.

EXAMPLE 16

17-Acetoxy-17-Phenylyohimbane

A solution of 2.0 g. of the positively-rotating epimer of 17-phenylyohimbol obtained in Example 6 in 70 ml. of dry tetrahydrofuran (distilled from LiAlH₄), 60 ml. of dry pyridine, and 20 ml. of acetic anhydride are refluxed for six hours. Paper chromatography (Whatman No. 1 paper impregnated with the solution of 10% formamide and 90% acetone; chromatobox, heptane, benzene, acetone, 1:1:1) shows complete conversion ($R_f=0.95$). The excess tetrahydrofuran is removed, and the contents of the flask are poured into 150 ml. of ice-water. 20 ml. of ammonia are added and the mixture is filtered. The brown solid is dissolved in chloroform, dried over sodium sulfate, and the solvent removed in vacuo. The brown-black colored residue is chromatographed over acid-washed alumina, using ethyl acetate as an eluent. After removing the solvent of the eluate, the residue is triturated with 10 ml. of ethanol, giving 0.4 g. of orange-yellow colored crystals, M.P. 195–205° C., $[\alpha]_D^{25}=+45°$, C.=0.550, l.=1 dm., chloroform. Concentration of the mother liquor to about 5 ml. yields an additional 0.15 g. of orange colored crystals, $[\alpha]_D^{25}=+46°$, C.=0.45, l.=1 dm., chloroform. Two more recrystallizations from ethanol yield off-white crystals of the acetate ester of 17-phenylyohimbol, M.P. 199–201° C., $[\alpha]_D^{25}=+51°$, C.=0.625, l.=1 dm., chloroform; $[\alpha]_D^{25}=+57°$, C.=0.755, l.=1 dm., pyridine.

*Analysis.*—Calc. $C_{27}H_{30}N_2O_2$: C, 78.22; H, 7.30; N, 6.76. Found: C, 78.21; H, 7.45; N, 6.46.

The infrared absorption spectrum shows the following peaks in reciprocal centimeters: 1728, 1240, 1116, 981. The ultraviolet spectrum exhibits maxima at 224 mμ ($\epsilon=36,500$) and 280 mμ ($\epsilon=7,600$); a shoulder at 288 mμ ($\epsilon=6,300$); and a minima at 246 mμ ($\epsilon=1,750$).

EXAMPLE 17

17-Benzylyohimbol

A solution of 15 g. of yohimbone in 1 liter of dry tetrahydrofuran (distilled from LiAlH₄) is added dropwise to 200 ml. of 1.05 N ethereal benzyl magnesium chloride at −70° C. with vigorous stirring. After one hour a solution of 30 g. of ammonium chloride in 60 ml. of water is added and the mixture is stirred and filtered. The two liquid phases in the filtrate are separated, the organic phase is dried over sodium sulfate and the solvent removed in vacuo. Trituration of the residue with 30 ml. of acetonitrile yields 13.0 g. of material, M.P. 220–272° C., $[\alpha]_D^{25}=-29°$, C.=0.500, l.=1 dm., chloroform. Concentration of the mother liquor to about 10 ml. and cooling yields another crop of product, M.P. 240–258° C., $[\alpha]_D^{25}=-11°$, C.=0.930, l.=1 dm., chloroform. Extraction of the insoluble part with chloroform and evaporation of the solvent yields an additional 1.5 g., $[\alpha]_D^{25}=\pm 0.0°$, chloroform. The total yield of 17-benzylyohimbol is 15.5 g. (80% of theory).

EXAMPLE 18

The fraction weighing 13.0 g. and having an $[\alpha]_D^{25}=-29°$, chloroform, obtained in Example 17 is dissolved in 350 ml. of hot chloroform, concentrated to about 150 ml., and allowed to cool. Filtration yields 5.5 g. of white crystals, $[\alpha]_D^{25}=-50°$, chloroform. Two more recrystallizations of this material from chloroform yield purified negatively-rotating epimer of 17-benzylyohimbol, M.P. 281–285° C., $[\alpha]_D^{25}=-55°$, C.=0.575, l.=1 dm., chloroform.

*Analysis.*—Calc. $C_{26}H_{30}N_2O$: C, 80.79; H, 7.82; N, 7.25. Found: C, 81.01; H, 8.16; N, 7.03.

EXAMPLE 19

17-(p-Tolyl)Yohimbol

A solution of 30 g. of yohimbone in 2.2 liter of tetrahydrofuran (distilled from LiAlH₄) is added to 280 ml. of 1.2 N ethereal p-tolyl lithium at 0° C., with stirring, over a period of 90 minutes. After one hour 150 ml. of water are added at 0° C., and the mixture is stirred for one hour to complete solution. The two phases are separated, and the aqueous phase is extracted twice with 200 ml. of chloroform. The combined organic extracts are dried over sodium sulfate and the solvent removed in vacuo. Trituration with 60 ml. of hot acetonitrile and cooling yields 12.0 g. of white crystals, M.P. 261–263° C., $[\alpha]_D^{25}=-57°$, C.=0.75, l.=1 dm., chloroform. Evaporation of the mother liquor in vacuo yields a residue which on refluxing in 150 ml. of ether and cooling gives 19.2 g. of yellow crystals, M.P. 145–170° C., $[\alpha]_D^{25}=+45°$, C.=0.500, l.=1 dm., chloroform. The total yield of 17-(p-tolyl)yohimbol is 31.2 g. (79.5% of theory).

EXAMPLE 20

The fraction having an $[\alpha]_D^{25}=+45°$, chloroform, from Example 19 is stirred magnetically with 90 ml. of acetone at 35° for four hours. Cooling and filtration gives 17.0 g. of white crystals, M.P. 150–160° C., $[\alpha]_D^{25}=+69°$, C.=1.04, l.=1 dm., chloroform. Recrystallization from acetone and then twice from acetone-methanol, gives positively-rotating analytically pure epimer of 17-(p-tolyl)yohimbol as white, fine needles, M.P. 163–170° C., $[\alpha]_D^{25}=+77°$, C.=1.325, l.=1 dm., chloroform; $[\alpha]_D^{25}=+83°$, C.=1.005, l.=1 dm., pyridine.

*Analysis.*—Calc. $C_{26}H_{30}N_2O \cdot CH_3OH$: C, 79.16; H, 8.02; N, 6.97. Found: C, 78.89; H, 8.02, N, 7.20.

The infrared absorption spectrum shows the following peaks in reciprocal centimeters: 3420, 3280, 1518, 819. The ultraviolet spectrum exhibits maxima at 223.5 mμ

($\epsilon$=46,500) and 281 m$\mu$ ($\epsilon$=8,500); a shoulder at 289.5 m$\mu$ ($\epsilon$=7,400); and a minima at 245.5 m$\mu$ ($\epsilon$=5,100).

EXAMPLE 21

The fraction having an $[\alpha]_D^{25}$=−57°, chloroform, from Example 19 is recrystallized twice from acetone, yielding the purified negatively-rotating epimer of 17-(p-tolyl)yohimbol as white needles, M.P. 262–265° C., $[\alpha]_D^{25}$=−63°, C.=1.065, l.=1 dm., chloroform; $[\alpha]_D^{25}$=−24°, C.=1.00, l.=1 dm., pyridine.

*Analysis.*—Calc. $C_{26}H_{30}N_2O$: C, 80.79; H, 7.82; N, 7.25. Found: C, 80.70; H, 7.73; N, 6.92.

The infrared absorption spectrum shows the following peaks in reciprocal centimeters: 3510, 3360, 3255, 1520, 815. The ultraviolet spectrum exhibits maxima at 223 m$\mu$ ($\epsilon$=40,550) and 280 m$\mu$ ($\epsilon$=7,080); shoulders at 273 m$\mu$ ($\epsilon$=6,760) and 287 m$\mu$ ($\epsilon$=5,950); and a minima at 245 m$\mu$ ($\epsilon$=4,350).

EXAMPLE 22

*17-(p-Chlorophenyl)Yohimbol*

A solution of 35 g. of yohimbone in 2.3 liters of dry tetrahydrofuran (distilled from LiAlH$_4$) is added to 600 ml. of 0.9 N ethereal p-chlorophenyl magnesium bromide with stirring at 0° C. over a period of two hours. After one-half hour, a solution of 50 g. of ammonium chloride in 500 ml. of water is added and the mixture is stirred for ninety minutes. The two liquid phases are separated and the aqueous phase extracted twice with 100 ml. of chloroform. The combined organic extracts are dried over sodium sulfate and the solvent removed in vacuo. The semi-solid residue is then refluxed with 150 ml. of ether and 600 ml. of petroleum ether (B.P. 60–70° C.) for thirty minutes. After cooling to room temperature, the supernatant liquid is decanted and the solids are chromatographed over alumina (not acid-washed) using the ether as an eluent. The recrystallized fractions constituting 17-(p-chlorophenyl)yohimbol vary in rotation from $[\alpha]_D^{25}$=−57°, chloroform from the first fraction to $[\alpha]_D^{25}$=+89°, chloroform, for the final fractions.

EXAMPLE 23

The positively-rotating fractions obtained in Example 22 (average $[\alpha]_D^{25}$=+75°, chloroform) are recrystallized twice from ethyl acetate, giving a product, M.P. 230–235° C., $[\alpha]_D^{25}$=+94°, C.=0.830, l.=1 dm., chloroform. Further recrystallization from acetone-methanol, 1:1 mixture, yields crystals of pure positively-rotating epimer of 17-(p-chlorophenyl)yohimbol, M.P. 233–237° C., $[\alpha]_D^{25}$=+95°, C.=1.025, l.=1 dm., chloroform.

*Analysis.*—Calc. $C_{25}H_{27}N_2OCl$: C, 72.78; H, 6.69; N, 6.88; Cl, 8.96. Found: C, 73.50; H, 6.98; N, 6.77, Cl, 8.74.

EXAMPLE 24

The negatively-rotating fractions obtained in Example 22 (average $[\alpha]_D^{25}$=−55°, chloroform) are combined and further chromatographed over acid-washed alumina and then over magnesium silicate. The highest negatively-rotating fraction has an $[\alpha]_D^{25}$=−58°, chloroform. Recrystallization of this fraction from acetone-chloroform and then from acetone-methanol, 1:1 mixtures, yields crystals of pure negatively-rotating epimer of 17-(p-chlorophenyl)yohimbol, M.P. 262–264° C., $[\alpha]_D^{25}$=−58°, C.=0.900, l.=1 dm., chloroform.

*Analysis.*—Calc. $C_{25}H_{27}N_2OCl \cdot \frac{1}{2}CH_3OH$: C, 72.41; H, 6.91; N, 6.62; Cl, 8.38. Found: C, 72.06; H, 6.70; N, 6.83; Cl, 8.43.

EXAMPLE 25

*17-(p-Chlorophenyl)Yohimbol*

To 0.3 mol of p-chlorophenyl lithium in ether, prepared via n-butyl lithium by the method of Gilman et al., J. Am. Chem. Soc., 62, 2327 (1940), is added a solution of 15.0 g. of yohimbone in 1 liter of dry tetrahydrofuran (distilled from LiAlH$_4$) over a period of a hundred minutes with stirring at 0° C. After one hour, 150 ml. of water are added, the mixture is stirred, and the two phases separated. The aqueous layer is extracted with 100 ml. of methylene chloride, the combined extracts are dried over sodium sulfate and the solvent removed in vacuo. The brown, semi-solid residue is refluxed with 200 ml. of ether, the mixture is cooled and the tan-yellow colored crystals (8.5 g.) are recovered by filtration. Paper partition chromatography (heptane, benzene, acetone/ammonia atmosphere) shows the crystals to contain 70% of the positively-rotating epimer of 17-(p-chlorophenyl)yohimbol whereas the mother liquor contains 80% of 17-(p-chlorophenyl)yohimbol as the negatively-rotating epimer.

EXAMPLE 26

*17-(p-Fluorophenyl)Yohimbol*

A solution of 28.0 g. of yohimbone in 2 liters dry tetrahydrofuran (distilled over LiAlH$_4$) is added over ninety minutes to 400 ml. of 1.0 N ethereal p-fluorophenyl magnesium bromide at 0° C. with stirring. Ionophoresis (700 v./2 ma./5 N acetic acid/2 hours) shows complete addition (mobility in respect to yohimbone=0.80). 40.0 g. of ammonium chloride in 200 ml. of water are added to decompose the excess Grignard reagent and the complex, and the mixture is stirred until solution is complete. The two phases are separated and the aqueous phase extracted with two 150 ml. portions of chloroform. The combined extracts are dried over sodium sulfate and the solvent is removed in vacuo. The brown semi-solid is refluxed with 200 ml. of ether. After cooling overnight, 1.8 g. of white crystals separate, M.P. 250–256° C., $[\alpha]_D^{25}$=−57°. C.=0.80, l.=dm., chloroform. The paper partition chromatograph (Whatman No. 1, saturated with 10% formamide and 90% acetone; spiral chromatobox, heptane:benzene:acetone, 1:1:1; ammonia atmosphere; developed by potassium iodoplatinate) shows one spot (R$_f$=0.82) of considerably greater mobility than yohimbone (R$_f$=0.70).

The mother liquor is chromatographed over acid-washed alumina using, in sequence, ether, chloroform and methanol as eluents. No separation of the epimers is observed, although a substantial portion of the impurities are retained on the alumina. The eluate fractions are combined and evaporated to dryness. The residue is taken up in 150 ml. hot acetone. Concentration to 70 ml. and cooling yields 5.6 g. of 17-(p-fluorophenyl)yohimbol, containing about 90% of the positively-rotating epimer (R$_f$=0.75), M.P. 240–243° C., $[\alpha]_D^{25}$=+56°, C.=0.60, chloroform. Concentration of the mother liquor to 30 ml. and cooling yields 4.7 g. of 17-(p-fluorophenyl)yohimbol, containing about 85% of the negatively-rotating epimer (R$_f$=0.82), M.P. 245–250° C., $[\alpha]_D^{25}$=−51°, C.=0.50, chloroform.

EXAMPLE 27

The positively-rotating fraction from Example 26 having an $[\alpha]_D^{25}$=+56°, chloroform (5.6 g.), is recrystallized twice from hot acetone to yield pure positively-rotating epimer of 17-(p-fluorophenyl)yohimbol (R$_f$=0.75), M.P. 240–245° C., $[\alpha]_D^{25}$=+64°, C.=0.705, l.=1 dm., chloroform; $[\alpha]_D^{25}$=+53°, C.=0.840, l.=1 dm., pyridine.

EXAMPLE 28

The negatively-rotating fraction form Example 26 having a $[\alpha]_D^{25}$=−51°, chloroform, is recrystallized first from hot acetone and then from ethyl acetate to yield pure negatively-rotating epimer of 17-(p-fluorophenyl)-yohimbol, M.P. 254–258° C., $[\alpha]_D^{25}$=−58°, C.=0.75, l.=1 dm., chloroform; $[\alpha]_D^{25}$=−26°, C.=0.935, l.=1 dm., pyridine.

EXAMPLE 29

*17-p-Methoxyphenyl)Yohimbol*

A solution of 35 g. of yohimbone in 1.8 liters of dry tetrahydrofuran (distilled from LiAlH₄) is added with stirring to 500 ml. of 0.8 N ethereal p-anisyl-magnesium bromide over a period of 90 minutes at 0° C. After one hour a solution of 40 g. of ammonium chloride in 300 ml. of water is added and the mixture is stirred for two hours. The two liquid phases are separated and the aqueous phase is extracted with 70 ml. of chloroform. The combined extracts are dried over sodium sulfate and the solution is concentrated to 80 ml. After cooling, the solid is separated by filtration weighing ,19.5 g. $[\alpha]_D^{25}=-48°$, C.=0.45, l.=1 dm., 95% methanolic chloroform. The mother liquid is evaporated to dryness and dissolved in 200 ml. of acetone. Ethanolic hydrogen chloride is added to a pH of 4.5 and the crystals are recovered by filtration. Regeneration of this hydrochloride of 17 - (p - methoxyphenyl)yohimbol to the free base by treatment with ammonia and trituration with ethyl acetate yields 1.7 g. of material, M.P. 271–275° C., $[\alpha]_D^{25}=-51°$, C.=0.55, l.=1 dm., chloroform. The two solid fractions are combined, dissolved in 400 ml. of 5 N acetic acid, and the insoluble portion consisting of the coupling products (bianisyl) is separated by filtration. The clear filtrate is precipitated by ammonia, filtered, and the solvents dried in vacuo at 80° C., to yield 20.9 g. of tan colored material, $[\alpha]_D^{25}=-52°$, C.=0.45, l.=1 dm., chloroform. This material is redissolved in 1.2 liters of 1:1 mixture of chloroform-methanol and concentrated to the point when crystals began to separate (about 300 ml.). After cooling and filtration 4.3 g. of crystals are obtained, M.P. 284–286° C., $[\alpha]_D^{25}=-62°$, C.=0.550, l.=1 dm., chloroform. Recrystallization of this material from chloroform and then from methanol gives the pure negatively-rotating epimer of 17-(p-methoxyphenyl)yohimbol, M.P. 283–286° C., $[\alpha]_D^{25}=-61°$, C.=0.75, l.=1 dm., chloroform; $[\alpha]_D^{25}=-32°$, C=1.135, pyridine. The combined mother liquors are concentrated to about 110 ml. Upon cooling, 7.3 g. of material result, M.P. 280–285° C., $[\alpha]_D^{25}=-59°$, C.=0.500, l.=1 dm., chloroform. On concentration to 25 ml., another crop of 3.9 g., M.P. 279–285° C., $[\alpha]_D^{25}=-61°$, C=0.700, l.=1 dm., chloroform, is obtained. Evaporation of the mother liquor to dryness, treatment with the charcoal in 120 ml. of acetone-methanol, 1:1), and concentration to 40 ml. gives, upon cooling, an additional 3.1 g. of material, $[\alpha]_D^{25}=-59°$, C.=0.555, chloroform.

*Analysis.*—Calc. $C_{26}H_{30}N_2O_2$: C, 77.58; H, 7.51; N, 6.96. Found: C, 77.51; H, 7.47; N, 6.90.

EXAMPLE 30

*17-(o-Methoxyphenyl)Yohimbol*

A solution of 25.0 g. of yohimbone in 2 liters of dry tetrahydrofuran (distilled from LiAlH₄) is added with stirring to 400 ml. of 0.9 N ethereal o-anisyl magnesium bromide over a period of 90 minutes, at 0° C. After one hour a solution of 35 g. of ammonium chloride in 200 ml. of water is added and the mixture is stirred for two hours. The two resulting clear phases are separated, and the aqueous layer is extracted with 100 ml. of chloroform. The combined extracts are dried over sodium sulfate and the solvent removed in vacuo. Trituration of the orange-brown residue with 100 ml. of hot acetonitrile and cooling gives 12.1 g. of white crystals of the negatively-rotating epimer of 17-(o-methoxyphenyl)yohimbol, M.P. 258–263° C., $[\alpha]_D^{25}=-63.4°$, C.=1.0, l.=1 dm., chloroform. The mother liquor is evaporated to an oily residue in vacuo and taken up with 400 ml. of 5 N acetic acid and 250 ml. of benzene-petroleum ether (1:1). The mixture is shaken and the two phases separated. The benzene-petroleum ether layer, containing predominantly anisole, o-bromoanisole and o-bianisyl is discarded. The acetic acid phase is precipitated by ammonia, extracted with methylene chloride and dried over sodium sulfate. Evaporation of the solvent in vacuo and refluxing the semi-solid residue with 200 ml. of ether, gives upon cooling, 11.0 g. of yellow-orange colored solid, M.P. 185–192° C., $[\alpha]_D^{25}=+0°$, C.=0.800, l.=1 dm., chloroform. Concentration of the filtrate to 30 ml. and cooling gives an additional 4.0 g. of orange colored solid. Trituration of these combined solids with 35 ml. of acetonitrile and cooling, yields 6.2 g. of tan-colored crystals of 17-(o-methoxyphenyl)yohimbol, M.P. 188–215° C., $[\alpha]_D^{25}=+0°$, C.=0.75, l.=1 dm., chloroform.

Paper partition chromatography of this fraction (Whatman No. 1 paper impregnated with a solution of 90% acetone and 10% formamide; spiral chromatobox, heptane:benzene:acetone, 1:1:1; ammonia atmosphere) shows 10% as the negatively-rotating epimer ($R_f$=0.89) and 90% as the positively-rotating epimer ($R_f$=0.81).

EXAMPLE 31

The negatively-rotating fraction obtained in Example 30, $[\alpha]_D^{25}=-63.4°$, chloroform (12.1 g.) is recrystallized first from hot acetone, then from acetone-methanol, 9:1, and finally twice from acetone-methanol, 1:1, to yield pure negatively-rotating epimer of 17-(o-methoxyphenyl)yohimbol, M.P. 263–266° C., $[\alpha]_D^{25}=-68°$, C.=1.015, l.=1 dm., chloroform; $[\alpha]_D^{25}=-29°$, C.=0.760, l.=1 dm., pyridine.

*Analysis.*—Calc. $C_{26}H_{30}N_2O$: C, 77.58; H, 7.51; N, 6.96. Found: C, 77.41; H, 7.59; N, 7.05.

The infrared absorption spectrum shows the following peaks in reciprocal centimeters: 3292, 1605, 795, 770. The ultraviolet spectrum shows maxima at 225 m$\mu$ ($\epsilon$=39,250) and 275 m$\mu$ ($\epsilon$=8,750); a shoulder at 289 m$\mu$ ($\epsilon$=6,200); and a minima at 245.5 m$\mu$ ($\epsilon$=1,100).

EXAMPLE 32

The fraction obtained in Example 30 weighing 6.2 g. and having an $[\alpha]_D^{25}=\pm0°$, chloroform, is recrystallized from methanol to yield the pure positively-rotating epimer of 17-(o-methoxyphenyl)yohimbol, M.P. 186–210° C., $[\alpha]_D^{25}=+15.7°$, C.=1.00, chloroform; $[\alpha]_D^{25}=16.0°$, C.=1.025, pyridine.

*Analysis.*—Calc. $C_{26}H_{30}N_2O_2 \cdot CH_3OH$: C, 74.62; H, 7.88; N, 6.45. Found: C, 74.63; H, 7.78; N, 6.66.

The infrared absorption spectrum showed the following peaks in reciprocal centimeters: 3297, 1597, 789, 750. The ultraviolet spectrum showed maxima at 224.5 m$\mu$ ($\epsilon$=44,650) and 276.5 m$\mu$ ($\epsilon$=9,150); a shoulder at 287.5 m$\mu$ ($\epsilon$=6,400); and a minima at 245.5 m$\mu$ ($\epsilon$=1,900).

EXAMPLE 33

*17-(p-N,N-Dimethylanilyl) Yohimbol*

A solution of 25.0 g. of yohimbone in 1.8 liters of dry tetrahydrofuran (distilled over LiAlH₄) is added over 90 minutes to 0.3 mol of an ethereal p-N,N-dimethylanilyl lithium at 0° C. with stirring.

Ionophoresis (700 v./2 ma./100 minutes/5 N acetic acid) shows complete addition. (Mobility in respect to yohimbone=1.3.) Paper partition chromatography (Whatman No. 1 paper impregnated with 10% of formamide and 90% of acetone, in spiral-chromatobox, heptane:benzene:acetone, 1:1:1, in ammonia atmosphere, developed by potassium iodoplatinate) shows two distinctive spots: one near the solvent front ($R_f$=0.95) and one slightly faster moving than yohimbone ($R_f$=0.85; $R_f$ of yohimbone=0.78). Water (300 ml.) is added to decompose the excess reagent and the complex, and the two layers are separated. The aqueous phase is extracted with two 100 ml. portions of chloroform. The combined extracts are dried over sodium sulfate and the solvent is removed in vacuo. The black-blue semi-solid, upon trituration with 25 ml. of acetonitrile, gives 9.1 g. of tan-colored crystals of 17-(p-N,N-dimethylanilyl)yohimbol, M.P. 248–258° C., $[\alpha]_D^{25}=-61°$, C.=0.45, l.=1 dm., chloroform.

EXAMPLE 34

The product from Example 33 with an $[\alpha]_D^{25} = -61°$, chloroform (9.1 g.), is recrystallized from methanol-acetonitrile, 1:1, and twice from methanol to yield white crystals of the pure negatively-rotating epimer of 17-(p-N,N-dimethylanilyl)yohimbol ($R_f = 0.95$), M.P. 258–264° C., $[\alpha]_D^{25} = -59°$, C.=0.75, l.=1 dm., chloroform; $[\alpha]_D^{25} = -38°$, C.=0.95, l.=1 dm., pyridine.

*Analysis.*—Calc. $C_{27}H_{33}N_3O$: C, 78.03; H, 8.00; N, 10.11. Found: C, 77.88; H, 8.16; N, 10.01.

Infrared absorption spectrum showed the following peaks in reciprocal centimeters: 3250, 1612, 1525, 815. The ultraviolet spectrum showed maxima at 226 m$\mu$ ($\epsilon$=37,000) and 254 m$\mu$ ($\epsilon$=17,750); shoulders at 279 m$\mu$ ($\epsilon$=9,000) and 289 m$\mu$ ($\epsilon$=7,530); and a minima at 239.5 m$\mu$ ($\epsilon$=13,050).

EXAMPLE 35

17-($\alpha$-Naphthyl)yohimbol

A solution of 25 g. yohimbone in 1.9 liters of warm tetrahydrofuran (distilled from LiAlH$_4$) is added at 0° C. to 300 ml. of 1.0 N ethereal $\alpha$-naphthyl magnesium bromide with stirring over one and a half hours. The subsequent ionophoresis (700 v./2 ma./5 N CH$_3$COOH/90 minutes)

shows complete addition. A solution of 40 g. ammonium chloride in 200 ml. of water is added and the mixture is stirred for one hour to complete solution. The two phases are separated and the aqueous phase extracted twice with 100 ml. of ethyl acetate. The combined extracts are dried over sodium sulfate and the solvent removed in vacuo. Trituration of the residue with 40 ml. of hot ethanol and cooling gives 14.2 g. of material, M.P. 243–249° C., $[\alpha]_D^{25} = -17°$, C.=0.50, l.=1 dm., chloroform. Further concentration of the mother liquor to about 20 ml. and cooling yields 8.0 g. of crystals, M.P. 245–248°, $[\alpha]_D^{25} = -19$, C.=0.55, l.=1 dm., chloroform.

The two combined crops from the above experiment are refluxed with 250 ml. of acetone, and the insoluble crystals (5.8 g.) are filtered off. This solid is dissolved in 200 ml. of hot acetone and concentrated to about 100 ml. After cooling, 2.6 g. of white crystals are obtained, $[\alpha]_D^{25} = +2°$, C.=0.35, l.=1 dm., chloroform;

$$[\alpha]_D^{25} = -20°$$

C.=0.82, l.=1 dm., pyridine. Recrystallization of this material from acetone gives analytically pure white crystals of the positively-rotating epimer of 17-($\alpha$-naphthyl)yohimbol, M.P. 272–278° C., $[\alpha]_D^{25} = +4°$, C.=0.40, l.=1 dm., chloroform; $[\alpha]_D^{25} = -23°$, C.=0.80, l.=1 dm., pyridine.

*Analysis.*—Calc. $C_{29}H_{30}N_2O$: C, 82.43; H, 7.16; N, 6.63. Found: C, 82.24; H, 7.11; N, 6.51.

The infrared absorption spectrum shows the following peaks in reciprocal centimeters: 3422, 3205, 1598, 1265, 1095, 1029, 894, 782. The ultraviolet spectrum showed maxima at 225.5 m$\mu$ ($\epsilon$=106,100) and 280.5 m$\mu$ ($\epsilon$=12,800); a shoulder at 289 m$\mu$ ($\epsilon$=9,600); and a minima at 243.5 m$\mu$ ($\epsilon$=1,600).

The acetone soluble part of the two combined crops (22.2 g. $[\alpha]_D^{25} = -18$, chloroform) is concentrated to about 100 ml., 50 ml. hot ethanol added and the mixture allowed to cool. Filtration gives 8.0 g. of white crystals, M.P. 257–260° C., $[\alpha]_D^{25} = -18°$, C.=0.53, l.=1 dm., chloroform. Concentration of the mother liquor to about 70 ml. and cooling gives 4.2 g. of material, M.P. 260–263° C., $[\alpha]_D^{25} = -19.5°$, C.=0.455, l.=1 dm., chloroform. Further concentration of the mother liquor to 30 ml. and chilling gives an additional 1.7 g. of material, M.P. 252–256° C., $[\alpha]_D^{25} = -15°$, C.=0.50, l.=1 dm., chloroform. The fraction having the rotation $$[\alpha]_D^{25} = -19.5°$$

chloroform, is recrystallized from acetone-ethanol (1:1), giving analytically pure white crystals of the negatively-rotating epimer of 17-($\alpha$-naphthyl)yohimbol, M.P. 262–264° C., $[\alpha]_D^{25} = -19°$, C.=0.45, l.=1 dm., chloroform; $[\alpha]_D^{25} = +7°$, C.=0.80, l.=1 dm., pyridine.

*Analysis.*—Calc. $C_{29}H_{30}N_2O$: C, 82.43; H, 7.16; N, 6.63. Found: C, 82.14; H, 7.14; N, 6.92.

The infrared absorption spectrum shows the following peaks in reciprocal centimeters: 3320, 1519, 1304, 783. The ultraviolet spectrum shows maxima at 224.5 m$\mu$ ($\epsilon$=116,500) and 279 m$\mu$ ($\epsilon$=15,000); a shoulder at 283 m$\mu$ ($\epsilon$=12,000); and a minima at 243 m$\mu$ ($\epsilon$=4,100).

EXAMPLE 36

17-(p-Biphenylyl)Yohimbol

A solution of 12 g. of yohimbone in 650 ml. of dry tetrahydrofuran is added with stirring to 0.2 mol of ethereal p-biphenylyl lithium at 0° C. over a period of one hour. After addition of 100 ml. of water and stirring for one hour, the two phases are separated and the aqueous phase is extracted with 100 ml. of chloroform. The combined extracts are dried over sodium sulfate and the solution is concentrated to 80 ml. Cooling and filtration yields 9.0 g. of off-white crystals, M.P. 268–273° C., $[\alpha]_D^{25} = -42°$, C.=0.835, l.=1 dm., chloroform. The filtrate is evaporated in vacuo to an oily residue which is taken up with 400 ml. of 4 N acetic acid. The solid residue, consisting mostly of biphenylyl bromide, biphenyl and bis-biphenyl, is filtered off, and the filtrate is precipitated by ammonia. The precipitate is taken up with chloroform, dried over sodium sulfate, and the solvent removed in vacuo. Trituration with acetone-acetonitrile and cooling gives 1.1 g. of material, M.P. 165–172° C., $[\alpha]_D^{25} = +118°$, C.=0.80, l.=1 dm., chloroform.

EXAMPLE 37

The fraction obtained in Example 36 having an $$[\alpha]_D^{25} = +118°$$

chloroform (1.1 g.), is recrystallized twice from acetone-methanol, 1:1, to yield the pure positively-rotating epimer of 17-(p-biphenyl-yohimbol, M.P. 170–175° C., $$[\alpha]_D^{25} = +129°$$

C.=0.95, l.=1 dm., chloroform.

*Analysis.*—Calc. $C_{31}H_{32}N_2O \cdot \frac{1}{2}H_2O$: C, 81.36; H, 7.49; N, 6.12. Found: C, 81.10; H, 7.34; N, 6.32.

EXAMPLE 38

The fraction obtained in Example 36 having an $[\alpha]_D^{25} = -42°$, chloroform (9.0 g.), is dissolved in 400 ml. 5 N acetic acid and filtered. The filtrate is precipitated by ammonia. The solids are recrystallized, in sequence, from chloroform, acetone and finally acetone-methanol to yield the pure negatively-rotating epimer of 17-(p-biphenylyl)yohimbol, M.P. 282–284° C., $[\alpha]_D^{25} = -51°$, C.=0.47, l.=1 dm., chloroform; $[\alpha]_D^{25} = -25°$, C.=1.175, l.=1 dm., pyridine.

*Analysis.*—Calc. $C_{31}H_{32}N_2O$: C, 82.99; H, 7.19; N, 6.24. Found: C, 82.91; H, 7.20; N, 5.90.

EXAMPLE 39

A solution in 35 ml. of hot absolute ethanol of 0.1 g. of the negatively-rotating epimer of 17-(p-biphenylyl)-yohimbol obtained in Example 38 is mixed with a solution of 0.2 g. citric acid monohydrate in 5 ml. ethanol. The solution is concentrated to 20 ml. and 60 ml. ethyl acetate are added. The resulting precipitate is recovered by filtration and recrystallized from acetone-methanol, 1:2, to yield the hemicitrate monomethanolate salt of the negatively-rotating epimer of 17-(p-biphenylyl)yohimbol, M.P. 265–272° C., $[\alpha]_D^{25} = -28.6°$, C.=0.38, l.=1 dm., pyridine.

*Analysis.*—Calc. $C_{31}H_{32}N_2O \cdot \frac{1}{2}C_6H_8O_7 \cdot CH_3OH$: C, 72.89; H, 6.99; N, 4.86. Found: C, 72.98; H, 6.74; N, 4.53.

The following example is illustrative of pharmaceutical compositions comprising, as the active ingredient therein, a 17-R-yohimbol of this invention.

EXAMPLE 40

A quantity of 10 grams of the hydrochloride salt of the positively-rotating epimer of 17-phenylyohimbol prepared as described in Example 8, 343 grams of U.S.P. lactose and 7 grams of magnesium stearate are thoroughly blended and passed through a number 20 screen. Gelatin capsules are each filled with 360 mg. of the blend. Each capsule contains 10 mg. of active ingredient.

It is understood that the foregoing detailed description is given merely by way of illustration and that many variations may be made therein without departing from the spirit of our invention.

Having described our invention, what we desire to secure by Letters Patent is:

1. A member selected from the group consisting of yohimbane derivatives of the formula:

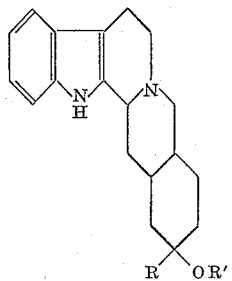

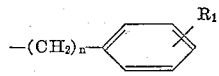

wherein R is a member selected from the group consisting of an alkyl group of the formula $C_nH_{2n+1}$ where $n$ is 1 to 18, an alkenyl group of the formula $C_mH_{2m-1}$ where $m$ is 2 to 18, an alkynyl group of the formula $C_mH_{2m-3}$, unsubstituted cycloalkyl having 5 to 7 carbon atoms, naphthyl and radicals of the formula:

$$-(CH_2)_n-\underset{}{\underset{}{\bigcirc}}-R_1$$

wherein $n$ is 0 to 2 and $R_1$ is a member selected from the group consisting of hydrogen, lower alkyl, lower alkoxy, halogen, phenyl and di-lower alkylamino, and wherein R' is a member selected from the group consisting of hydrogen and an acyl radical of an acid selected from the group consisting of an unsubstituted lower alkyl carboxylic acid, an unsubstituted lower alkyl sulfonic acid, benzoic acid, benzene sulfonic acid, and benzoic and benzene sulfonic acids wherein the benzene ring is substituted with 1 to 3 members selected from the group consisting of lower alkyl, lower alkoxy, and halogen; and the pharmaceutically acceptable non-toxic acid addition and quaternary ammonium salts thereof.

2. 17-methylyohimbol.
3. 17-ethynylyohimbol.
4. 17-cyclohexylyohimbol.
5. 17-phenylyohimbol.
6. 17-phenylyohimbol hydrochloride.
7. 17-acetoxy-17-phenylyohimbane.
8. 17-benzylyohimbol.
9. 17-(p-tolyl)yohimbol.
10. 17-(p-chlorophenyl)yohimbol.
11. 17-(p-fluorophenyl)yohimbol.
12. 17-(p-methoxyphenyl)yohimbol.
13. 17-(o-methoxyphenyl)yohimbol.
14. 17-(p-N,N-dimethylanilyl)yohimbol.
15. 17-(α-naphthyl)yohimbol.
16. 17-(p-biphenylyl)yohimbol.
17. A method of preparing a 17-substituted yohimbol of the formula:

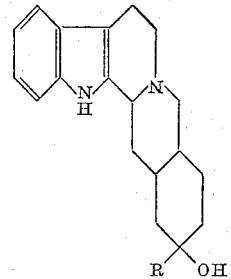

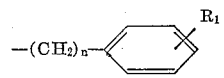

wherein R is a member selected from the group consisting of an alkyl group of the formula $C_nH_{2n+1}$ where $n$ is 1 to 18, an alkenyl group of the formula $C_mH_{2m-1}$ where $m$ is 2 to 18, an alkynyl group of the formula $C_mH_{2m-3}$, unsubstituted cycloalkyl having 5 to 7 carbon atoms, naphthyl and radicals of the formula $$-(CH_2)_n-\underset{}{\underset{}{\bigcirc}}-R_1$$

wherein $n$ is 0 to 2 and $R_1$ is a member selected from the group consisting of hydrogen, lower alkyl, lower alkoxy, halogen, phenyl and di-lower alkylamino which comprises mixing yohimbone at a temperature between about 0° C. and about −70° C. with an excess of a reagent selected from the group consisting of RMgX wherein X is a member selected from the group consisting of chlorine, bromine and iodine and RM wherein M is a member selected from the group consisting of lithium, potassium and sodium.

18. A method according to claim 17 wherein the reaction is carried out in an inert solvent.

19. A method according to claim 17 wherein a solution of yohimbone in an inert solvent is added to a solution of said reagent in an inert solvent.

References Cited in the file of this patent

Signaigo et al.: Jour. Amer. Chem. Soc., vol. 55 (1933), pages 3326–3332.

Henne et al.: Jour. Amer. Chem. Soc., vol. 58 (1936), page 882.

Simons: Fluorine Chemistry, Academic Press, New York (1950), page 402.

Karrer et al.: Chem. Abstracts, vol. 48 (1954), page 181.

Migrdichian: Organic Synthesis, Reinhold, New York, N.Y. (1957), pages 740 and 741.